(12) United States Patent
Erdmann

(10) Patent No.: US 8,968,448 B2
(45) Date of Patent: Mar. 3, 2015

(54) PORTABLE FUEL CONTAINER EMISSIONS CONTROL

(75) Inventor: Matthew Lorenz Erdmann, Ypsilanti, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 13/584,239

(22) Filed: Aug. 13, 2012

(65) Prior Publication Data

US 2012/0297983 A1 Nov. 29, 2012

Related U.S. Application Data

(62) Division of application No. 12/468,106, filed on May 19, 2009, now Pat. No. 8,261,947.

(51) Int. Cl.
*B01D 46/10* (2006.01)
*B67D 7/04* (2010.01)
*B01D 46/54* (2006.01)
*B65D 51/16* (2006.01)

(52) U.S. Cl.
CPC .............. *B67D 7/0476* (2013.01); *B01D 46/10* (2013.01); *B01D 46/543* (2013.01); *B65D 51/1616* (2013.01); *B01D 2279/35* (2013.01)
USPC .............. 96/6; 96/4; 96/155; 96/219; 96/137; 55/385.4

(58) Field of Classification Search
USPC ........... 96/4, 6, 134, 137, 155, 219; 55/385.4; 220/371; 215/261; 222/189.09
See application file for complete search history.

(56) References Cited

U.S. PATENT DOCUMENTS

| | | | | |
|---|---|---|---|---|
| 1,841,691 | A * | 1/1932 | Wilson | 220/371 |
| 2,675,093 | A * | 4/1954 | McCall et al. | 96/139 |
| 3,160,487 | A * | 12/1964 | Risse et al. | 55/417 |
| 3,961,724 | A * | 6/1976 | Kapsy | 220/371 |
| 5,515,994 | A * | 5/1996 | Goglio | 220/372 |
| 6,095,356 | A * | 8/2000 | Rits | 215/261 |
| 7,267,112 | B2 * | 9/2007 | Donahue et al. | 123/518 |
| 2006/0011173 | A1 * | 1/2006 | Davis et al. | 123/520 |

* cited by examiner

*Primary Examiner* — Kevin P Shaver
*Assistant Examiner* — Nicholas J Weiss
(74) *Attorney, Agent, or Firm* — Quinn Law Group, PLLC.

(57) ABSTRACT

An emissions device for use with a container assembly with a vent opening is provided. The emissions device includes a housing configured to be mounted to the container. The housing includes a backing plate that has at least one opening. A membrane is supported by the backing plate and extends over the opening. The membrane is configured to allow passage of vapor and prevent passage of liquid. A filter is located within the housing such that vapor that passes from the at least one opening through the membrane then passes through the filter. At least one spring is positioned within the housing and is configured to compress the filter.

20 Claims, 4 Drawing Sheets

US 8,968,448 B2

PORTABLE FUEL CONTAINER EMISSIONS CONTROL

CROSS-REFERENCE TO RELATED APPLICATION

This application is a divisional application of U.S. patent application Ser. No. 12/468,106, filed May 19, 2009, which is hereby incorporated by reference in its entirety.

TECHNICAL FIELD

The invention relates to an emissions device for a container, and more particularly, to a portable fuel container assembly designed to control fuel emissions.

BACKGROUND OF THE INVENTION

Portable fuel containers are commonly used by consumers to transport fuel from fuel supply locations to machines requiring fuel for operation, e.g. lawnmowers. The portable fuel containers are typically equipped with a handle to assist in transportation, a vent to control flow of fuel vapor and makeup air, and a pour spout. The fuel container vent allows air to enter and vapor to exit the portable fuel container. The vent accommodates changing conditions within the portable fuel container resulting from environment changes and fuel usage. In some cases, venting while dispensing fuel from the container is accomplished through a passageway in the pour spout. Furthermore, the portable fuel container may contain an additional access opening for adding fuel to the container at the fuel pump. Alternatively, the fuel container pour spout may be removable to allow adding fuel to the portable fuel container through the spout opening.

Increasing environmental concerns have resulted in fuel containers having devices for limiting fuel emissions while dispensing fuel from the container. However, fuel emissions during transportation and storage of the fuel container remain unaddressed.

SUMMARY OF THE INVENTION

An emissions device for use with a container assembly is provided. The emissions device includes a housing configured to be mounted to the container. The housing includes a backing plate that has at least one opening. A membrane is supported by the backing plate and extends over the opening. The membrane is configured to allow passage of vapor and prevent passage of liquid. A filter is located within the housing such that vapor passing from the opening in the backing plate through the membrane then passes through the filter. At least one spring is positioned within the housing and is configured to compress the filter.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
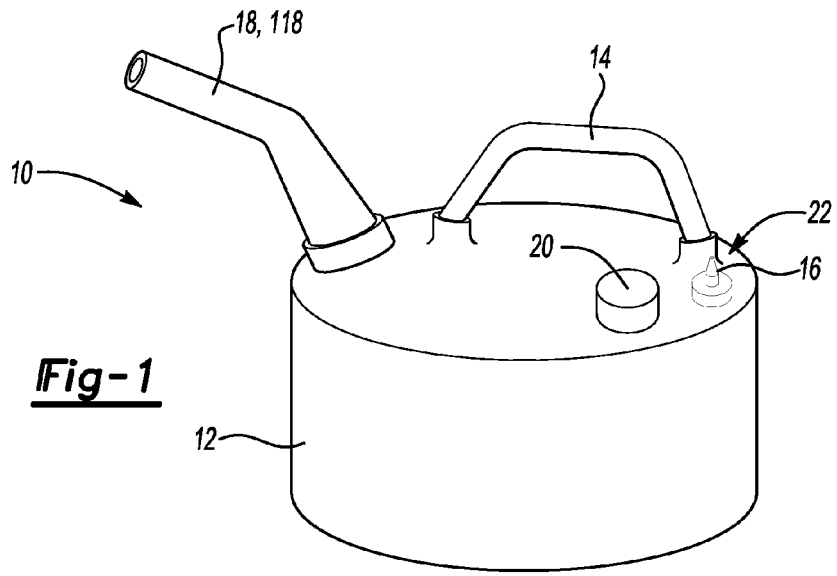
FIG. 1 is a schematic perspective illustration of a portable fuel container.

Referring to the drawings, wherein like reference numbers refer to like components, FIG. 1 shows a portable fuel container assembly 10 having a container 12. The portable fuel container assembly 10 has a handle 14, a vent opening 16, and a pour spout 18. A fuel cap 20 may also be located over a fuel opening (not shown) for adding fuel to the container 12. Alternately, the sealing function of a fuel cap 20 may be replaced with a sealing spout, thus eliminating the need for a second fuel opening 20. An over pressure relief (OPR) valve 22 is assembled within the vent opening 16 to control vapor flow from the portable fuel container assembly 10.

Figure 2:
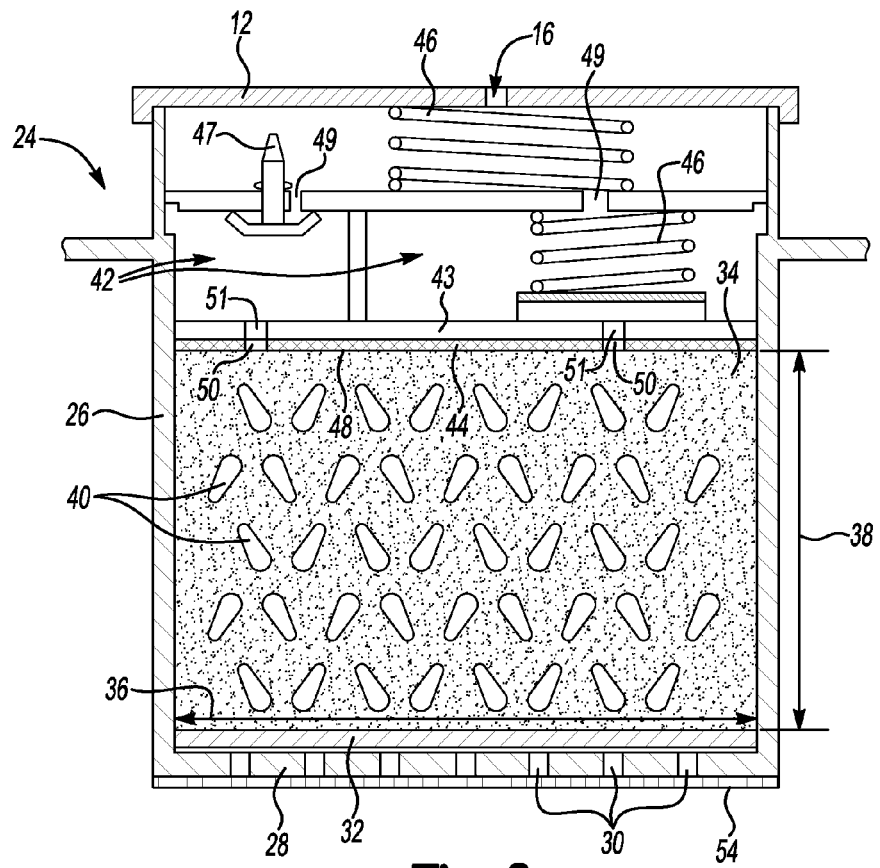
FIG. 2 is a schematic cross-sectional illustration of one embodiment of an emissions control device for use with the portable fuel container of FIG. 1.

Referring to FIG. 2, an enlarged cross-sectional schematic view of a portion of the portable fuel container assembly 10 is shown. An emissions control device 24 is mounted within the portable fuel container assembly 10 to the housing of the container 12. The emissions control device 24 includes a device housing 26 which is secured to the container 12. Alternatively, the device housing 26 may be integrally formed with the container 12. The emissions control device 24 is located such that the vent opening 16 is surrounded by the device housing 26 within the container 12. That is, any vapor within the container 12 enters the device housing 26 to reach the vent opening 16 and the OPR valve 22. Likewise, any fresh air from the outside passes through the vent opening 16 and the vacuum relief opening 49 to enter the container 12.

The emissions control device 24 includes a membrane (or liquid discriminating valve) 32 and a backing plate 28. The backing plate 28 defines a plurality of plate openings 30 through which vapor may enter the emissions control device 24. The membrane 32 is secured to the backing plate 28, which can be integrally formed with the housing 26. That is, the membrane 32 and backing plate 28 are located between the emissions filter 34 and the vapor (and fuel) within the container 12. The membrane 32 may also be secured to the backing plate 28 for additional support, or the membrane 32 may be secured to the backing plate 28, which is then secured to the housing 26.

The membrane 32 is secured to the housing 26 such that the membrane 32 extends over all of the plate openings 30. The membrane 32 is illustrated as a generally flat membrane 32. However, the membrane 32 may also be a cylinder or cone, or it may be pleated or otherwise shaped to increase the surface area of the membrane 32. One skilled in the art would know the proper shape for a membrane 32 for a particular emissions control device 24 and portable fuel container assembly 10.

The membrane 32 is preferably liquid discriminating. That is, the membrane 32 is manufactured from a material that allows vapor to pass through the membrane 32 but blocks liquid from passing through. The membrane 32 may be secured to the housing 26 by welding, adhesive, heat sealing, insert molding, or other methods. One skilled in the art would know the appropriate attachment required for a particular housing 26 and membrane 32 arrangements. Alternatively, as mentioned above, the membrane 32 can be replaced by a liquid discriminating valve.

An emissions filter 34 is located within the device housing 26 and is supported by the backing plate 28. The emissions filter 34 has a width 36 and a depth 38. The emissions filter 34 is wide enough to cover all of the plate openings 30. The emissions filter 34 is formed of a material to remove environmental contaminants 40 from the vapor. For example, the emissions filter 34 may be an activated carbon filter for removing hydrocarbons from the vapor. The vapor entering the device housing 26 flows through the emissions filter 34. After passing through the emissions filter 34 the filtered vapor enters a housing cavity 42. In the embodiment shown, there are multiple housing cavities 42 in fluid communication with the emissions filter 34. The depth 38 of the emissions filter 34 is determined by the type of material forming the emissions filter, the capacity of the container 12, and the desired capacity of the emissions filter 34. The membrane 32 (or the liquid discriminating valve) protects the emissions filter 34 from liquid fuel, which would otherwise damage the ability of the emissions filter 34 to capture environmental contaminants 40, as is known by those skilled in the art.

A filter cover 44 is located above the emissions filter 34 within the housing 26. At least one spring 46 is arranged between the emissions filter 34 and the housing 26 or the container 12, as shown. The spring 46 applies a force to the compression plate 43 and filter cover 44. Due to the force applied by the spring 46, the compression plate 43 and filter cover 44 apply a generally even force over a surface 48 of the emissions filter 34. The force on the emissions filter 34 assists in compressing the emissions filter 34 to extend the life of the emissions filter 34.

The filter cover 44 may include a plurality of cover openings 50 to allow the vapor to pass through the emissions filter 34 to the housing cavity 42. Likewise, the compression plate 43 may include a plurality of plate openings 51 to allow the vapor to pass through the emissions filter 34 to the housing cavity 42.

Thus, vapor exiting the container 12 through the vent opening 16 passes through the membrane 32 and the plurality of plate openings 30 to enter the housing 26. Once the vapor is within the housing 26, it passes through the emissions filter 34, prior to entering the housing cavity 42. The filtered vapor remains within the housing cavity 42 until sufficient pressure builds to open the OPR valve 22 (shown in FIG. 1) and to vent the filtered vapor from within the housing cavity 42. As a result of the emissions device 24 being mounted to the container 12, the vapor exiting the container 12 through the vent opening 16 has been filtered of environmental contaminants 40.

Vapor stored in the emissions filter 34 is desorbed when fresh air enters the emissions device 24 through the vent hole 16, past the vacuum relief opening 49 and the vacuum relief device 47. The fresh air then passes through the emissions filter 34 back into the container 12. Fresh air entering the container 12 through the emissions device 24 occurs when makeup air is required to replace the volume previously occupied by fuel dispensed from the fuel container assembly 10 or through cooling occurring during normal diurnal cycles.

The emissions control device 24 may further include an additional coarse filter 54. The coarse filter 54 may assist in preventing liquid and larger contaminants from reaching the membrane 32. When the membrane 32 is exposed to liquid, the liquid may slow the flow rate of the vapor through the membrane 32. Thus, the coarse filter 54 may deter liquid from reaching the membrane 32 and help maintain the vapor flow rate through the membrane 32.

Figure 3:
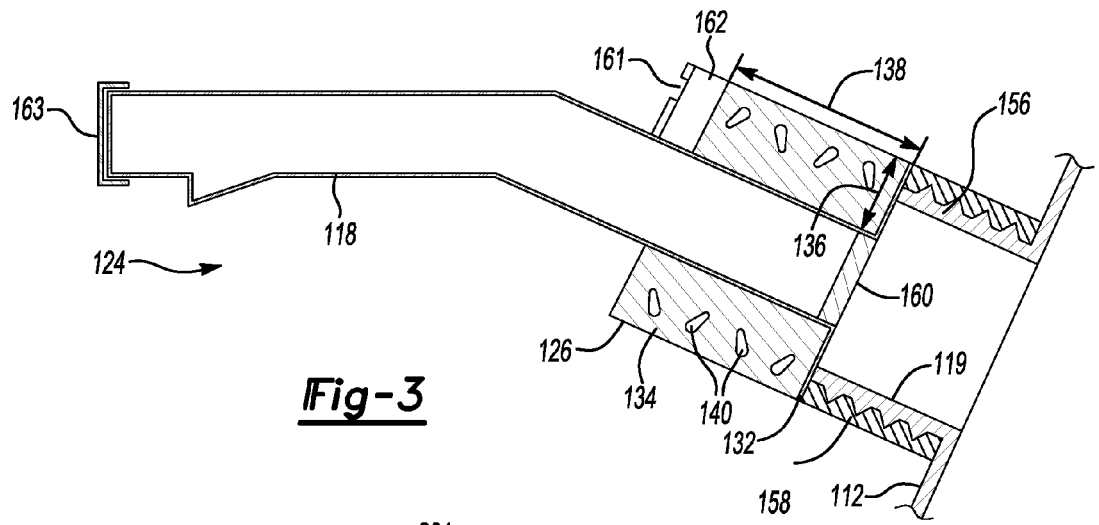
FIG. 3 is a schematic cross-sectional illustration of a second embodiment of an emissions control device for the pour spout of the portable fuel container of FIG. 1.

FIG. 3 illustrates a second embodiment of an emissions control device 124 incorporated into the pour spout 118 for the portable fuel container assembly 10 (illustrated in FIG. 1). The container 112 defines a pour spout opening 119 for the pour spout 118. The container 112 has a threaded container portion 156 and the pour spout 118 has a threaded spout portion 158. The threaded spout portion 158 may be received by the threaded container portion 156 to retain the pour spout 118 to the container 112. An emissions control device 124 is secured to the pour spout 118 outside the container 112.

The emissions control device 124 includes an emissions filter 134 within a housing 126. The emissions filter 134 is formed of a material to remove environmental contaminants 140 from the vapor as the vapor flows through the emissions filter 134. For example, the emissions filter 134 may be a carbon filter for removing hydrocarbons from the vapor. The emissions filter 134 has a width 136 and a depth 138. The width 136 of and the depth 138 of the emissions filter 134 are determined by the type of material forming the emissions filter, the capacity of the container 112, and the desired capacity of the emissions filter 134. Vapor exiting the container 112 passes through the emissions filter 134. When the pour spout 118 is sealed (for storage of the fuel container assembly 10), vapor will exit the container 112 through a vent port 161. The pour spout 118 may include a liquid discriminating vapor permeable membrane 132 that allows the vapor to enter the emissions filter 134 and prevents liquid from passing through and reaching the emissions filter 134. As the vapor passes through the emissions filter 134, the environmental contaminants 140 are adsorbed by the emissions filter 134.

The portable fuel container assembly 10 or the emissions device 124 may also include a pressure relief valve 162. The pressure relief valve 162 may be used to seal the pour spout 118 during storage or non-use of the portable fuel container assembly 10.

The portable fuel container assembly 10 or the emissions device 134 may also include a sealing valve 160 or a sealing cap 163, to prevent spilling of liquid from the container 112. Thus, the pour spout 118 would be sealed by the sealing valve 160 or the sealing cap 163 during storage or non-use, and the emissions filter 134 would filter vapor during storage or non-use of the portable fuel container assembly 10. The emissions filter 134 may be used instead of or in conjunction with the emissions filter 34 of the above embodiment.

Furthermore, based upon the design of the container 112, the emissions filter 134 may be located in the pour spout 118 such that the emissions filter 134 is located above a fuel line of fuel within the container 112. A vapor dome of the container 112 is the interior portion of the container 112 that is above the fuel line of the fuel within the container 112. Depending on the design of the container 112, it may be necessary to use a breather line (not shown) to connect the vapor dome within the container 112 to the pour spout 118. It may also be desirable, in some cases, to move the inlet for fresh air during refueling to the tip of the dispensing nozzle. This would prevent makeup air from slowing or stopping the flow of fuel from the refueling container when the fuel level in the container 12 reaches the tip of the dispensing nozzle, thereby reducing the chance for fuel spillage.

Figure 4:
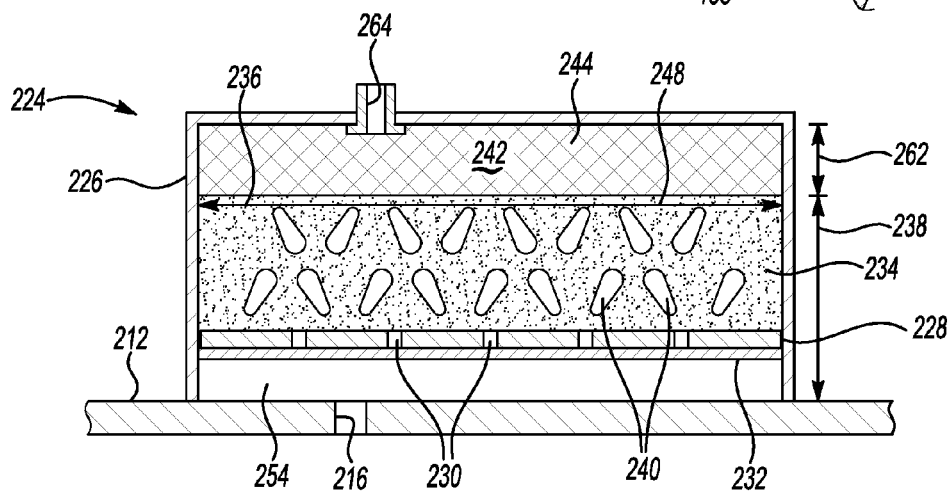
FIG. 4 is a schematic perspective cross-sectional illustration in partial cross-sectional view of a third embodiment of an emissions control device for the portable fuel container of FIG. 1.

FIG. 4 illustrates a third embodiment of an emissions control device 224 for the portable fuel container assembly 10 (illustrated in FIG. 1). The emissions control device 224 is mounted on the container 212. The emissions control device 224 includes a device housing 226, which is secured to the container 212. Alternatively, the device housing 226 may be integrally formed with the container 212 either inside or outside the main body of the container 212. The emissions control device 224 is located such that the vent opening 216 in the container 212 is surrounded by the device housing 226. That is, any vapor within the container 212 enters the device housing 226 after passing through the vent opening 216.

The emissions control device 224 includes a backing plate 228. The backing plate 228 defines a plurality of plate openings 230 through which vapor may enter the emissions control device 224. A membrane 232 is secured to the device housing 226 below the backing plate 228. That is, the membrane 232 is located between the backing plate 228 and the vent opening 216. The membrane 232 may also be secured to the backing plate 228 for additional support, or the membrane 232 may be secured to the backing plate 228 which is then secured to the device housing 226.

The membrane 232 is secured to the device housing 226 such that the membrane 232 extends over the plurality of plate openings 230. The membrane 232 is illustrated as a generally flat membrane 232. However, the membrane 232 may also be a cylinder, may be pleated, or may be otherwise shaped to increase the surface area of the membrane 232. One skilled in the art would know the proper shape for a membrane 232 for a particular emissions control device 224 and portable fuel container assembly 10.

The membrane 232 is preferably of a material that allows vapor to pass through the membrane 232 but prohibits liquid from passing through. The membrane 232 may be secured to the device housing 226 by welding, adhesive, heat sealing, insert molding, or other methods. One skilled in the art would know the appropriate attachment required for a particular device housing 226 and membrane 232 arrangement.

An emissions filter 234 is located within the device housing 226 and is supported by the backing plate 228. The emissions filter 234 has a width 236 and a depth 238. The width 236 of the emissions filter 234 is sufficient to cover all of the plurality of plate openings 230. The emissions filter 234 is formed of a material to remove environmental contaminants 240 from the vapor. For example, the emissions filter 234 is an activated carbon filter for removing hydrocarbons from the vapor. The vapor entering the device housing 226 must flow through the emissions filter 234. After passing through the emissions filter 234 the filtered vapor enters a housing cavity 242. The depth 238 of the emissions filter 234 is determined by the type of material forming the emissions filter 234, the capacity of the container 212, and the desired capacity of the emissions filter 234.

A filter cover 244 is located above the emissions filter 234 within the device housing 226. In the embodiment shown, the filter cover 244 is a layer of porous foam that fills the housing cavity 242 and allows vapor to pass through the filter cover 244. The filter cover 244 has a cover thickness 262 to maintain a generally even force over a surface 248 of the emissions filter 234. The force on the emissions filter 234 by the filter cover 244 assists in compressing the emissions filter 234 to extend the life of the emissions filter 234 over time.

Vapor exiting the container 212 through the vent opening 216 must pass through the membrane 232 and the plurality of plate openings 230. Then the vapor passes through the emissions filter 234 prior to entering the housing cavity 242, which is filled with the porous foam of the filter cover 244. The vapor remains within the housing cavity 242 until exiting the device housing 226 through a device opening 264. As a result, the vapor exiting the container 12 through the vent opening 216 has been filtered by the emissions control device 224 of environmental contaminants 240. Likewise, fresh air entering the container 12 must pass through a device opening 264, into the device housing 226, and through the filter cover 244 to the emissions filter where it desorbs the stored environmental contaminants 240 (i.e. the hydrocarbons) before entering the container 212.

The emissions control device 224 may further include an additional coarse filter 254. The coarse filter 254 may assist in preventing liquid and larger contaminants from reaching the membrane 232. As the membrane 232 is exposed to liquid, the liquid may slow the flow rate of the vapor through the membrane 232. Thus, the coarse filter 254 may deter liquid from reaching the membrane 232 and help to maintain the vapor flow rate through the membrane 232.

Figure 5:
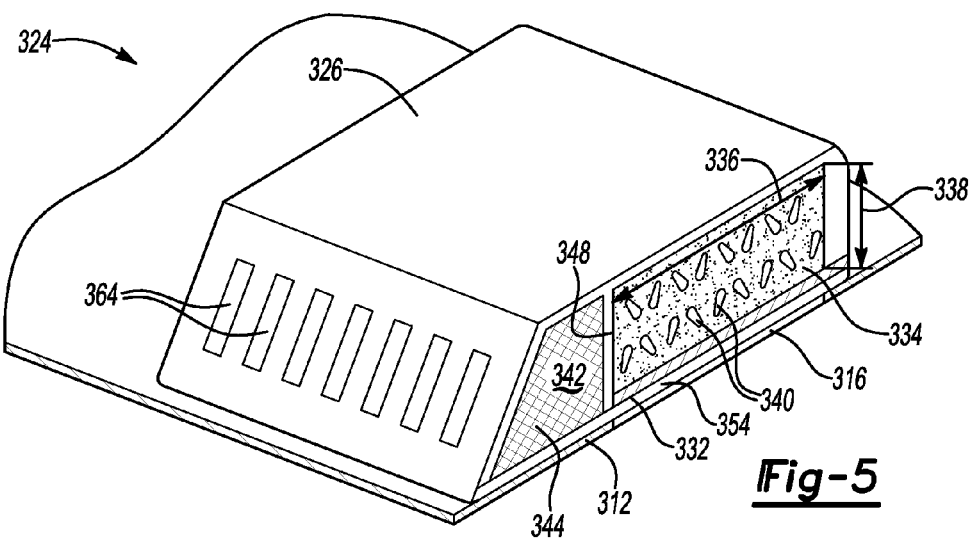
FIG. 5 is a schematic perspective cross-sectional illustration in partial cross-sectional view of a fourth embodiment of an emissions control device for use with the portable fuel container of FIG. 1.

FIG. 5 illustrates a fourth embodiment of an emissions control device 324 for the portable fuel container assembly 10 (illustrated in FIG. 1). The emissions control device 324 may be mounted externally of the container 312. The emissions control device 324 includes a device housing 326 which is mounted on or secured to the container 312. Alternatively, the device housing 326 may be integrally formed with the container 312. The emissions control device 324 is located such that the device housing 326 is near the vent opening 316 in the container 312. That is, any vapor within the container 312 must enter the device housing 326 after exiting from the vent opening 316.

The emissions control device 324 includes a membrane 332 that is secured to the device housing 326. The membrane 332 is illustrated as a generally flat membrane 332. However, the membrane 332 may also be a cylinder, may be pleated, or may otherwise be shaped to increase the surface area of the membrane 332. One skilled in the art would know the proper shape for a membrane 332 for a particular emissions control device 324 and portable fuel container assembly 10.

The membrane 332 is preferably of a material that allows vapor to pass through the membrane 332 but prohibits liquid from passing through. The membrane 332 may be secured to the device housing 326 by weld, adhesive, heat sealing, insert molding, or other methods. One skilled in the art would know the appropriate attachment required for particular device housing 326 and membrane 332 arrangements.

An emissions filter 334 is located within the device housing 326. The emissions filter 334 is formed of a material to remove environmental contaminants 340 from the vapor. For example, the emissions filter 334 is a carbon filter for removing hydrocarbons from the vapor. The vapor entering the device housing 326 must flow through the emissions filter 334. After passing through the emissions filter 334, the filtered vapor enters a housing cavity 342. The emissions filter 334 has a width 336 and a depth 338. The width 336 and depth 338 of the emissions filter 334 is determined by the type of material forming the emissions filter, the capacity of the container 312, and the desired capacity of the emissions filter 334.

A filter cover 344 is located adjacent to the emissions filter 334, within the device housing 326. In the embodiment shown, the filter cover 344 is a layer of porous foam that fills the housing cavity 342 and allows vapor to pass through the filter cover 344. The filter cover 344 maintains a generally even force over a surface 348 of the emissions filter 334. The force on the emissions filter 334 by the filter cover 344 assists in compressing the emissions filter 334 to extend the life of the emissions filter 334 over time.

Vapor exiting the container 312 through the vent opening 316 passes through the membrane 332. Then the vapor passes through the emissions filter 334 prior to entering the housing cavity 342, which is filled with the porous foam of the filter cover 344. The vapor remains within the housing cavity 342 until exiting the device housing 326, through at least one device opening 364. As a result, the vapor exiting the container 312 through the vent opening 316 has been filtered by the emissions control device 324 of environmental contaminants 340. Fresh air would follow the reverse path, entering the emissions device 324 through the at least one device opening 364 before passing through the emissions filter 334, where the emissions filter 334 desorbs the stored environmental contaminants 340 (i.e. the hydrocarbons). The environmental contaminants 340 return to the container 12 through the vent opening 316.

The emissions control device 324 may further include an additional coarse filter 354. The coarse filter 354 may assist in preventing liquid and larger contaminants from reaching the membrane 332. As the membrane 332 is exposed to liquid, the liquid may slow the flow rate of the vapor through the membrane 332. Thus, the coarse filter 354 may deter liquid from reaching the membrane 332 and help to maintain the vapor flow rate through the membrane 332.

Figure 6:
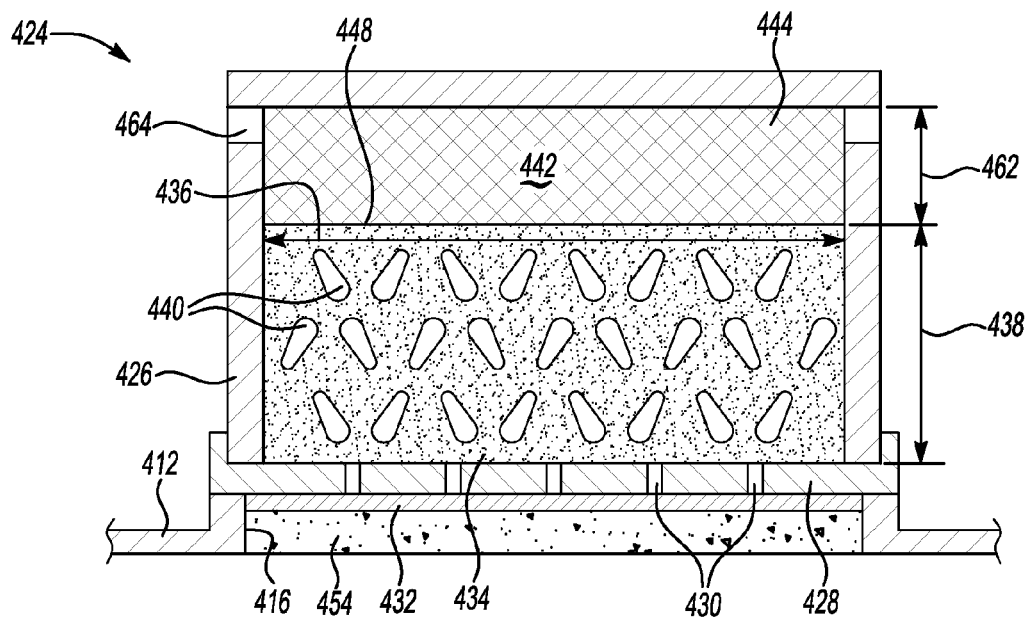
FIG. 6 is a schematic cross-sectional illustration of a fifth embodiment of an emissions control device for use with the portable fuel container of FIG. 1.

FIG. 6 illustrates a fifth embodiment of an emissions control device 424 for the portable fuel container assembly 10 (illustrated in FIG. 1). The emissions control device 424 may be mounted externally of the container 412. The emissions control device 424 includes a device housing 426, which is secured to the container 412. The emissions control device 424 is located such that the vent opening 416 in the container 412 is surrounded by the device housing 426. That is, any vapor within the container 412 must enter the device housing 426 after exiting from the vent opening 416. The emissions control device 424 includes a backing plate 428.

Figure 7A:
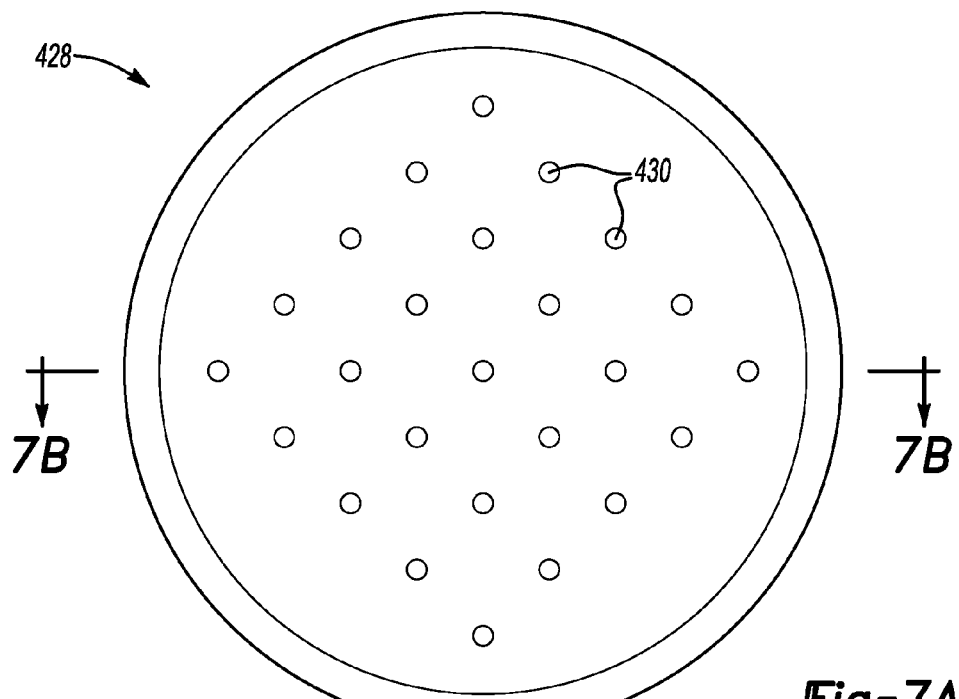
FIG. 7A is a schematic top view illustration of a sixth embodiment of an emissions control device for use with the portable fuel container of FIG. 1.
Figure 7B:
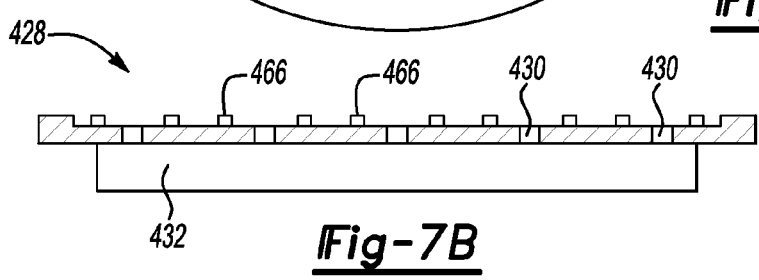
FIG. 7B is a schematic cross-sectional view illustration of the sixth embodiment of the emissions control device of FIG. 7A taken at lines 7B-7B for use with the portable fuel container of FIG. 1.
Figure 7C:
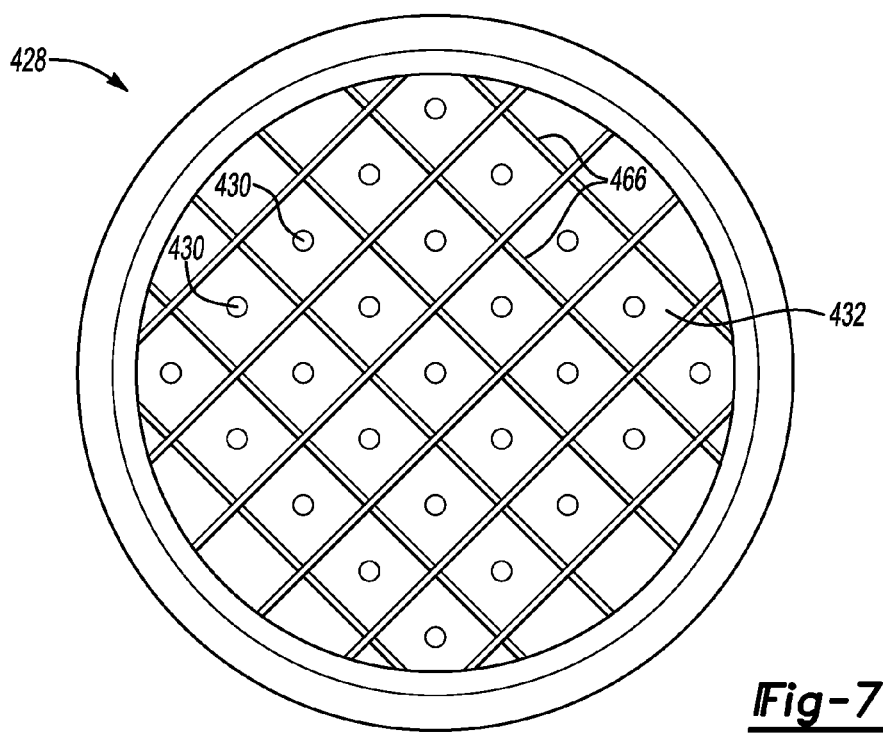
FIG. 7C is a schematic bottom view illustration of the sixth embodiment of the emissions control device for use with the portable fuel container of FIGS. 1, 7A and 7B.

FIGS. 7A-7C illustrate the backing plate 428. The backing plate 428 defines a plurality of plate openings 430 through which vapor may enter the emissions control device 424. A membrane 432 is secured to the backing plate 428 and the backing plate 428 is secured to the device housing 426 (shown in FIG. 6). In the embodiment shown, the membrane 432 is located within the vent opening 416 (shown in FIG. 6). The backing plate 428 may also have strengthening ribs 466 for additional support.

The membrane 432 is secured to the backing plate 428 such that the membrane 432 extends over all of the plurality of plate openings 430. The membrane 432 is illustrated as a generally flat membrane 432. However, the membrane 432 may also be a cylinder, may be pleated, or may be otherwise shaped to increase the surface area of the membrane 432. One skilled in the art would know the proper shape for a membrane 432 for a particular emissions control device 424 and portable fuel container assembly 10.

The membrane 432 is preferably of a material that allows vapor to pass through the membrane 432 but prohibits liquid from passing through. The membrane 432 may be secured to the backing plate 428 by welding, adhesive, heat sealing, insert molding, or other methods. One skilled in the art would know the appropriate attachment required for a particular backing plate 428 and membrane 432 arrangements.

Referring back to FIG. 6, an emissions filter 434 is located within the device housing 426 and may be supported by the backing plate 428. The emissions filter 434 has a width 436 and a depth 438. The width 436 of the emissions filter 434 is sufficient to cover all of the plurality of plate openings 430. The emissions filter 434 is formed of a material to remove environmental contaminants 440 from the vapor. For example, the emissions filter 434 is a carbon filter for removing hydrocarbons from the vapor. The vapor entering the device housing 426 flows through the emissions filter 434. After passing through the emissions filter 434 the filtered vapor enters a housing cavity 442. The depth 438 of the emissions filter 434 is determined by the type of material forming the emissions filter, the capacity of the container 412, and the desired capacity of the emissions filter 434.

A filter cover 444 is located above the emissions filter 434 within the device housing 426. In the embodiment shown, the filter cover 444 is a layer of porous foam that fills the housing cavity 442 and allows vapor to pass through the filter cover 444. The filter cover 444 has a cover thickness 462, to maintain a generally even force over a surface 448 of the emissions filter 434. The force on the emissions filter 434 by the filter cover 444 assists in compressing the emissions filter 434 to extend the life of the emissions filter 434 over time.

Vapor exiting the container 412 through the vent opening 416 passes through the membrane 432 and the plurality of plate openings 430. Then, the vapor passes through the emissions filter 434 before entering the housing cavity 442, which is filled with the porous foam of the filter cover 444. The filtered vapor remains within the housing cavity 442 until exiting the device housing 426 through a device opening 464. As a result, the vapor exiting the container 12 through the vent opening 416 has been filtered of environmental contaminants 440 by the emissions control device 424. Fresh air would follow the reverse path, entering the emissions device 424 through at least one opening 464 before passing through the emissions filter 434, where the emissions filter 434 desorbs stored the stored environmental contaminants 440 (i.e. the hydrocarbons). The environmental contaminants 440 returned to the container 12 through the vent opening 416.

The emissions control device 424 may further include an additional coarse filter 454. In the embodiment shown, the coarse filter is located within the vent opening 416 below the membrane 432. The coarse filter 454 is supported by the backing plate 428 and the membrane 432 or may be secured to the container 412. The coarse filter 454 may assist in preventing liquid and larger contaminants from reaching the membrane 432. As the membrane 432 is exposed to liquid, the liquid may slow the flow rate of the vapor through the membrane 432. Thus, the coarse filter 454 deters liquid from reaching the membrane 432 to help maintain the vapor flow rate through the membrane 432.

While the best modes for carrying out the invention have been described in detail, those familiar with the art to which this invention relates will recognize various alternative designs and embodiments for practicing the invention within the scope of the appended claims.

The invention claimed is:

1. An emissions device for use with a container that has a vent opening, the emissions device comprising:
   a housing configured to be mounted entirely inside of the container around the vent opening, wherein the housing includes a backing plate that has at least one opening;
   a membrane supported by the backing plate and extending over said at least one opening, wherein the membrane is configured to allow passage of fuel vapor and prevent passage of liquid fuel;

a filter located within the housing such that fuel vapor passing from said at least one opening through the membrane then passes through the filter;
at least one spring positioned within the housing;
a compression plate positioned between said at least one spring and the filter and having a width substantially equal to a width of the filter;
wherein said at least one spring presses against the compression plate such that
the compression plate compresses a depth of the filter.

2. The emissions device of claim 1, further comprising:
a filter cover overlaying the filter and having a width substantially equal to a width of the filter;
wherein the compression plate overlays the filter cover and is positioned between the filter cover and said at least one spring; and
wherein the filter cover and the compression plate have at least partially aligned openings that allow fuel vapor to pass out of the filter through the at least partially aligned openings.

3. The emissions device of claim 2, wherein the filter cover and the compression plate overlay the entire filter so that fuel vapor venting out of the container through the vent opening of the container must pass through the at least partially aligned openings.

4. The emissions device of claim 1, wherein the filter is a first filter, and further comprising:
a second filter operatively connected to the backing plate so that the backing plate is between the second filter and the membrane, and the membrane is between the backing plate and the first filter.

5. The emissions device of claim 4, wherein the second filter is coarser than the first filter.

6. The emissions device of claim 1, wherein the filter is configured to adsorb hydrocarbons.

7. A container assembly comprising:
a container for liquid fuel that has a vent opening;
a housing configured to be mounted to the container, wherein the housing includes a backing plate that defines at least one opening;
a membrane supported by the backing plate and extending over said at least one opening, wherein the membrane is configured to allow passage of fuel vapor and prevent passage of liquid fuel;
a first filter located within the housing such that fuel vapor passes from the container through said at least one opening in the backing plate, through the membrane, and through the first filter to the vent opening;
a second filter abutting the backing plate and spanning directly over said at least one opening of the backing plate so that the backing plate is between the second filter and the membrane, and the membrane is between the backing plate and the first filter;
a compression plate;
a first compression spring positioned within the housing and configured to compress the compression plate toward the backing plate to compress the first filter against the membrane and the membrane against the backing plate; and
an additional compression spring abutting the container and configured to act against the first compression spring to assist in compressing the first filter.

8. The container assembly of claim 7, wherein the housing is integrally formed with the container.

9. The container assembly of claim 7, further comprising:
a filter cover overlaying the first filter;
wherein the compression plate overlays the filter cover between the filter cover and the first compression spring; and
wherein the filter cover and the compression plate have at least partially aligned openings that allow fuel vapor to pass out of the first filter through the at least partially aligned openings.

10. The container assembly of claim 9, wherein the filter cover and the compression plate overlay the entire first filter so that fuel vapor passing out of the container through the vent opening first passes through the at least partially aligned openings.

11. The container assembly of claim 7, wherein the second filter is coarser than the first filter.

12. The container assembly of claim 7, further comprising:
a vacuum relief valve positioned in the housing between the vent opening and the first filter; wherein the vacuum relief valve is configured to open to permit air to enter the container by passing through the first filter and the membrane to said at least one opening in the backing plate.

13. The container assembly of claim 7, wherein the first filter is configured to adsorb hydrocarbons.

14. The container assembly of claim 7, wherein the housing is mounted internally in the container.

15. The container assembly of claim 14, further comprising:
a pressure relief valve mounted externally to the container at the vent opening.

16. A container assembly comprising:
a container with a vent opening;
a housing mounted entirely inside of the container around the vent opening, wherein the housing includes a substantially flat backing plate that defines at least one opening;
a substantially flat membrane abutting the backing plate and extending over said at least one opening, wherein the membrane is configured to allow passage of fuel vapor and prevent passage of liquid fuel from the container;
a first filter located within the housing against the membrane such that fuel vapor passes from the container through said at least one opening in the backing plate, through the membrane, and through the first filter to the vent opening;
a substantially flat second filter abutting the backing plate and spanning directly over said at least one opening of the backing plate;
a compression plate;
a first compression spring positioned within the housing and configured to compress the compression plate toward the backing plate to compress the first filter against the membrane and the membrane against the backing plate; and
an additional compression spring abutting the container and configured to act against the first compression spring to assist in compressing the first filter.

17. The container assembly of claim 16, further comprising:
a vacuum relief valve supported within the housing between the vent opening and the compression plate and configured to open to permit air to enter the container by passing through the vent opening, the filter, and the membrane to said at least one opening in the backing plate.

18. The container assembly of claim 16, further comprising:
a filter cover overlaying the first filter and pressed by the compression plate against the first filter; and wherein the filter cover and the compression plate have at least partially aligned openings that allow fuel vapor to pass out of the first filter through the at least partially aligned openings.

19. A container assembly comprising:
a container with a vent opening;
a housing mounted entirely inside of the container around the vent opening, wherein the housing includes a substantially flat backing plate that defines at least one opening;
a substantially flat membrane abutting the backing plate and extending over said at least one opening, wherein the membrane is configured to allow passage of fuel vapor and prevent passage of liquid fuel from the container;
a first filter located within the housing against the membrane such that fuel vapor passes from the container through said at least one opening in the backing plate, through the membrane, and through the first filter to the vent opening;
a substantially flat second filter abutting the backing plate and spanning directly over said at least one opening of the backing plate;
a compression plate;
a first compression spring positioned within the housing and configured to compress the compression plate toward the backing plate to compress the first filter against the membrane and the membrane against the backing plate; and
a vacuum relief valve supported within the housing between the vent opening and the compression plate and configured to open to permit air to enter the container by passing through the vent opening, the filter, and the membrane to said at least one opening in the backing plate.

20. The container assembly of claim 19, further comprising:
a filter cover overlaying the first filter and pressed by the compression plate against the first filter; and
wherein the filter cover and the compression plate have at least partially aligned openings that allow fuel vapor to pass out of the first filter through the at least partially aligned openings.

\* \* \* \* \*